United States Patent [19]

Pacheco

[11] Patent Number: 4,932,628
[45] Date of Patent: Jun. 12, 1990

[54] PORTABLE ENGINE TEST STAND

[76] Inventor: Orlando D. Pacheco, 2884 Trades West F, Santa Fe, N. Mex. 87501

[21] Appl. No.: 320,177

[22] Filed: Mar. 6, 1989

Related U.S. Application Data

[63] Continuation-in-part of Ser. No. 174,379, Mar. 3, 1988, abandoned.

[51] Int. Cl.⁵ .............................................. F16M 1/00
[52] U.S. Cl. .................................... 248/676; 248/670; 248/671; 248/129
[58] Field of Search .............. 248/676, 639, 670, 671, 248/678, 129; 73/862.09, 117.2; 180/90, 298

[56] References Cited

U.S. PATENT DOCUMENTS

| | | | |
|---|---|---|---|
| 1,960,614 | 5/1934 | Anderson | 73/117.2 X |
| 2,565,473 | 8/1951 | Cline | 74/16 |
| 2,885,165 | 5/1959 | Smolen | 248/124 X |
| 2,924,095 | 2/1960 | Worstell | 73/116 |
| 2,991,649 | 7/1961 | Kinsey | 73/116 |
| 3,324,964 | 6/1967 | Davis | 180/6.48 |
| 3,913,394 | 10/1975 | Niehaus | 73/118 |
| 4,018,343 | 4/1977 | Perhed | 214/1 |
| 4,285,233 | 8/1981 | Swis | 73/116 |
| 4,466,294 | 8/1984 | Bennington et al. | 73/862.13 |
| 4,471,848 | 11/1982 | Skytoen | 180/90 |
| 4,640,521 | 2/1987 | Berfield | 248/129 X |
| 4,724,918 | 2/1988 | Raineri | 180/90 |
| 4,804,162 | 2/1989 | Rice | 248/129 X |

FOREIGN PATENT DOCUMENTS

| | | | |
|---|---|---|---|
| 0065040 | 11/1982 | European Pat. Off. | |
| 219274 | 4/1987 | European Pat. Off. | 248/129 |

Primary Examiner—Alvin C. Chin-Shue
Attorney, Agent, or Firm—Quirk, Tratos & Roethel

[57] ABSTRACT

A portable engine test stand incorporates the engine test monitoring devices to support and monitor the performance of a running engine in a single, relatively small and lightweight portable unit. The portable engine test stand has a plurality of engine support columns that are adjustable up and down, side to side and front to back to accommodate almost any size engine.

18 Claims, 1 Drawing Sheet

PORTABLE ENGINE TEST STAND

BACKGROUND OF THE INVENTION

This is a continuation-in-part of application Ser. No. 174,379, filed Mar. 3, 1988.

FIELD OF THE INVENTION

The present invention relates to an engine stand for testing a new or rebuilt engine and more particularly to a portable engine test stand integrated with engine test monitoring devices to support and monitor the performance of a running engine in a single portable unit.

DESCRIPTION OF RELATED ART

In the past the testing of engines prior to their installation was done by mounting the engine on a universal stand which was usually bulky, heavy and fixed in a permanent location near the testing, monitoring and controlling devices. Such a stand is shown in U. S. Pat. No. 2,565,473. Portable engine test stands were also usually bulky and heavy and the engine to be tested had to be transported to fixed stations housing the monitoring and controlling devices. Specifically, prior engine test stands did not permit an engine to be tested without transporting it to a fixed test station. These stands also did not permit working on a running engine.

The stand of the present invention is relatively light in weight and small enough to fit in the corner of a home garage or a small automobile repair facility. The stand of the present invention while supporting an engine can be rolled to any part of the repair facilities. Thus, an engine on the portable engine test stand of the present invention is not restricted to being tested at a fixed station, but can be tested anywhere in the repair facilities. In addition, the stand of the present invention permits the detection and adjustment of engine abnormalities, such as fluid leaks or improper timing, while the engine is running on the stand.

Accordingly, it is an object of the present invention to provide a relatively small and lightweight portable engine test stand integrating the engine test monitoring devices so that an engine may be tested in any desired part of the repair facilities. It is another object of the present invention to provide a portable engine test stand that can accommodate the majority of different engines that need to be tested.

It is a feature of the present invention to provide a portable engine test stand having a base mounted on wheels. Front and rear engine support columns are mounted on the base and are adjustable from front to back, side to side and up and down to accommodate almost any size engine. Various monitoring devices such as an oil pressure gauge, a tachometer, a temperature gauge, a starter button and an on-off switch are also mounted on the portable engine test stand.

It is an advantage of the present invention to eliminate the time involved in having to remove a new or rebuilt malfunctioning engine after installation in a vehicle. This is achieved by running the engine on the portable engine test stand prior to installation in the vehicle at any chosen RPM to determine whether the engine is running properly. A further advantage of the invention is to facilitate the ease of accomplishing the tuning operations of a new or rebuilt engine, such as valve adjustments, carburetor adjustments, ignition adjustments, timing adjustments, and the like, prior to the installation thereof in a vehicle. Another advantage of the present invention is to "break in" a new engine by running the engine on the stand for any chosen length of time whereby the engine can be tested to insure it is properly operating.

BRIEF SUMMARY OF THE INVENTION

The present invention relates to a portable engine test stand that incorporates the vital test monitoring devices into the stand. The present invention comprises a base, means for supporting an engine on the base and means for monitoring a running engine. The means for supporting the engine generally are a pair of front and rear columns on the base. Each pair of columns is vertically adjustable. Each column of a pair is laterally adjustable with respect to the other column of the pair to accommodate varying engine widths. In addition, the front pair of columns is longitudinally adjustable with respect to the rear pair of columns, and vice versa, to accommodate varying engine lengths. The means for monitoring a running engine are generally mounted on a frame which is attached to the base. The monitoring means include, but are not limited to, an oil pressure gauge, a tachometer, a temperature gauge, a switch for starting and stopping the engine and a starter button.

In addition, the portable engine test stand of the present invention has a pair of fixed front wheels and a pair of swiveling back wheels. The swiveling back wheels facilitate steering the stand when it is rolled. The present invention also can support means for maintaining a running engine, such as a gas tank and a battery.

DETAILED DESCRIPTION OF THE PREFERRED EMBODIMENT

Figure 1:
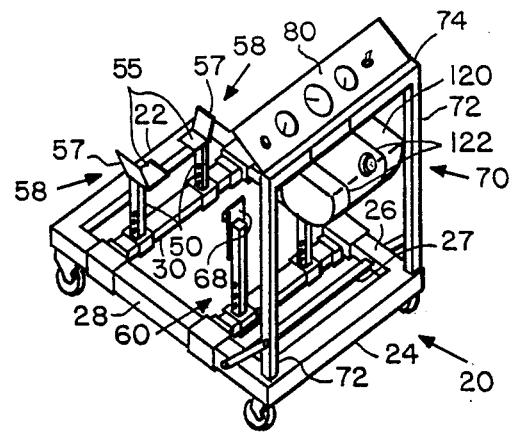
FIG. 1 shows a perspective view of the portable engine test stand of the invention.
Figure 2:
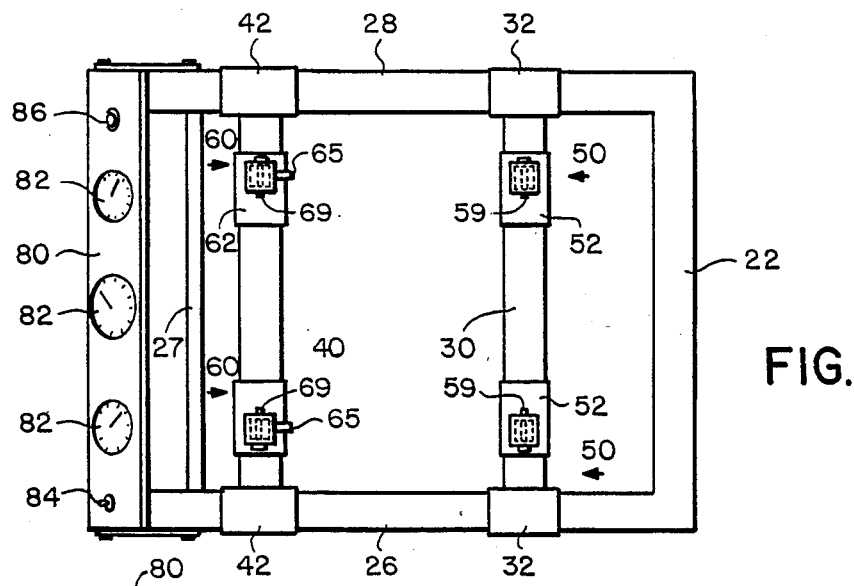
FIG. 2 is a top view of the portable engine test stand.

The portable engine test stand 10 of the present invention is shown generally in FIG. 1. The portable engine test stand 10 comprises an open rectangular base 20. The base 20 has a front end member 22, a rear end member 24, a left side member 26 and a right side member 28. In use, the rear of an engine to be tested (i.e., the end of the engine that connects to the drive shaft) is oriented toward the rear end member 24 of the base 20. Therefore all references are in relation to the orientation of the engine on the test stand with the front of the engine being adjacent to the front end member 22. In addition, the base 20 has a pair of rear end post members 29 shown in phantom in FIG. 3 mounted on the rear end member 24. The base 20 also includes a stabilizing member 27. As shown in FIG. 2, the stabilizing member 27 is in the interior of the base 20 and preferably located toward the rear of the base 20. The stabilizing member 27 rigidly connects the rearward portions of the left side member 26 and the right side member 28.

The portable engine test stand further comprises a first intermediate member 30 and a second intermediate member 40, as shown in FIG. 2. Both intermediate members 30 and 40 are preferably disposed in the interior of the base 20 and are coplanar with each other. Both intermediate members 30 and 40 connect the left side member 26 and the right side member 28 via collar members 32 and 42, respectively. The collar members 32 and 42 are located at the ends of the intermediate members 30 and 40 and are slideably mounted on the left side member 26 and the right side member 28.

Further, a pair of front engine vertical, telescopic support column members 50 are slideably mounted on the first intermediate member 30, as shown in FIGS. 1 and 2. The support column members 50 are also vertically adjustable. Similarly, a pair of rear engine vertical, telescopic support column members 60 are slideably mounted on the second intermediate member 40. The column members 60 are also vertically adjustable. Each of the column members 50 and 60 have a column member collar 52 and 62, respectively, that encircle the intermediate member 30 and 40, respectively, as shown in FIG. 2, which permit the column members 50 and 60 to slide along the length of the intermediate members 30 and 40. Advantageously, the slideably mounted intermediate members 30 and 40 and column members 50 and 60 enable adjustment of these members to adapt the stand 10 to accommodate the majority of engines on the market by simply pulling or pushing the members to the desired position to support an engine of a particular size.

Figure 3:
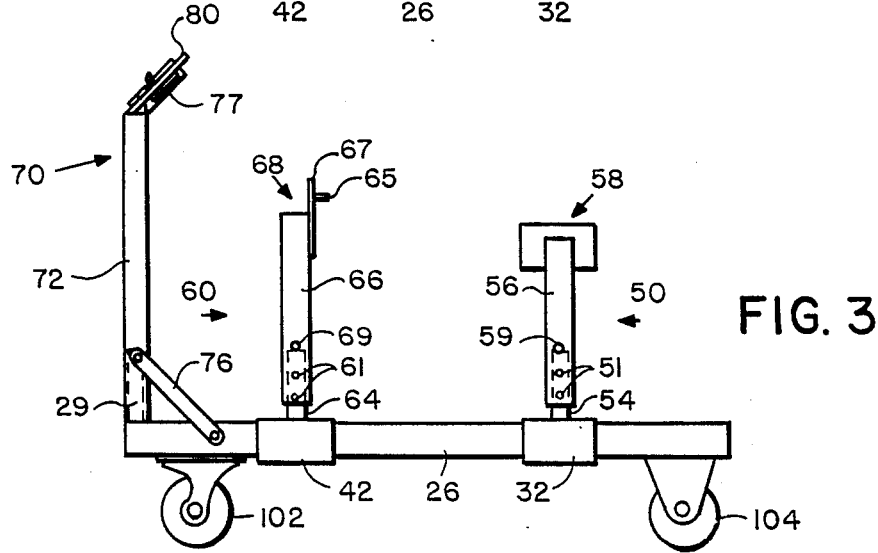
FIG. 3 is a side view of portable engine test stand.

Each of the column members 50 and 60 further comprise a vertical, inner support member 54 and 64. A hollow sleeve member 56 and 66 telescopically encompasses the inner support member 54 and 64, respectively, as shown in FIG. 3. In the preferred embodiment, each of the sleeve members 56 and 66 are of a hollow rectangular shape and have a plurality of apertures 51 and 61, respectively, of a predetermined diameter and longitudinally distributed a predetermined distance apart in diametrically opposed rows on opposites walls of the sleeve members 56 and 66.

As shown in FIGS. 2 and 3, each column member 50 and 60 has a pin member 59 and 69, respectively. The pin member 59 and 69 has length longer than the outer diameter of the sleeve member 56 and 66 and a circumference less than the sleeve member apertures 51 and 61. Theses dimensions facilitate the insertion of the pin member 59 and 69 through the diametrically opposed apertures 51 and 61 of the sleeve member 56 and 66, respectively. This facilitation permits the vertical adjustment of each sleeve member 56, 66, which is telescopically fitted over the inner support member 54, 64, by raising or lowering the sleeve member to the desired predetermined position and inserting the pin member 59 and 69 through the diametrically opposed apertures 51 and 61 of the sleeve member 56 and 66, respectively. The pin member 59 and 69 rests on the upright end of the inner member 54 and 64, and prohibits baseward vertical movement of the sleeve member 56 and 66, thus maintaining the vertical height of the column member 50 and 60.

In addition, each column member 50 and 60 has a bracket attached to the upright end of the sleeve member 56 and 66 for attaching the engine to the stand. The front column members 50 have brackets 58 which are designed to support the front of the engine via the engine mounts. In the preferred embodiment of the invention, the brackets 58 have a rectangular vane 57 nonvertically connected to a rest plate 55 that is horizontally attached to the end of the sleeve member 56, as shown in FIGS. 1 and 3. After the vertical height of each of the column members 50 is established, each is laterally adjusted manually along the intermediate member 30 and along the side members 26 and 28 so that the brackets 58 are positioned under the engine mounts, so that the front part of the engine rests of the brackets 58. The rear column members 60 have brackets 68 which are designed to support the rear of the engine. In the preferred embodiment of the invention, the brackets 68 comprise a pin plate 67, with a horizontally protruding mounting pin 65, vertically attached to the end of the sleeve member 66, as shown in FIGS. 1 and 3. By vertically adjusting the column member 60, engines are bolted to the mounting pins 65 in the same manner as engines are attached in automobiles, whereby the engine is fixed to the stand.

Unlike a conventional engine test stand, the portable engine test stand of the present invention integrates the testing monitors into a single portable unit. As shown in FIGS. 1 and 3, the preferred embodiment of the present invention has a test panel frame 70 comprising an upright member 72 mounted on each rear end post member 29 and a cross-bar 74 joining the top of the upright member 72 mounted on each rear end post member 29 and a cross-bar 74 joining the top of the upright member 72. A brace 76 supports each upright member 72 and connects to the lower portion of the upright member 72 with the side member 26 or 28, as shown in FIGS. 1 and 3. The braces 76 are necessary because of the stress imposed on the panel frame 70 by the force needed to push or pull the stand 10 supporting an engine. In addition, the panel frame 70 further includes a panel rest 77.

The test panel frame 70 further includes a test panel 80 which mounts on the panel rest 77. The test panel 80 contains devices 82 for monitoring the engine, including, but not limited to, an oil pressure gauge, a tachometer, and a temperature gauge. In addition, the test panel 80 of the preferred embodiment includes a toggle switch 84 for starting and stopping the engine and a starter button 86.

As shown in FIG. 1, the preferred embodiment of the present invention also comprises quarter-hoops 122 attached to the cross-bar 74 of the test panel frame 70 for holding a gas tank 120. A battery to start the engine can also be added by resting it on a platform placed over the stabilizing member 27 at the rear portion of the base. Furthermore, FIGS. 1 and 3 show a plurality of wheels, such as casters, supporting the base 20 of the portable engine stand 10. In the preferred embodiment, there are a pair of front wheels 104 which are fixed and a pair of back wheels 102 which swivel. The swiveling wheels 102 permit the steering of the stand 10 when pushed or pulled.

In the operation of the present invention, an engine is mounted on the stand after the stand has been adjusted to accommodate the engine. The engine is fitted with a stock exhaust and muffler system and attached to the battery, gas tank, and test panel devices. In addition, water inlet and outlet adapters are also attached to the engine. A water hose is attached to the inlet adapter at the water pump of the engine. Another water hose is attached to the outlet adapter for the water run off. By varying the amount of water running through the engine and watching the temperature gauge, a running engine can be maintained at a desired temperature.

Although the dimensions and manufacturing material of the open rectangular base is not critical, in the preferred operative embodiment of this invention, the front end member 22, rear end member 24, left side member 26 and right side member 28 are made of two inch square metal tubing. The intermediate members 30 and 40 are also two inch square tubing and preferably welded to the intermediate collars 32 and 42. The test panel frame 70 is made of one inch square metal tubing and is two feet in height. The test panel 80 is a flat rectangular aluminum panel.

Although the number of front column members 50 and rear column members 60 is not critical, in the preferred embodiment of this invention, there are two front column members 50 and two rear column members 60. The number of apertures 51 and 61 on each side of sleeve member 56 and 66 is preferably three, although fewer or greater can be used. In addition in the preferred embodiment, there are two front wheels 104 and two back wheels 102 on the underside of each end of the front member 22 and rear member 24, respectively. Furthermore, the gas tank 120 has preferably a capacity of approximately 1 ½ gallons.

While the invention has been illustrated with respect to one specific embodiment thereof, this embodiment should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A portable engine test stand, comprising:
   (a) an open rectangular base having a front end member, a rear end member, a left side member and a right side member;
   (b) a plurality of coplanar intermediate members mounted on the interior of the base and slideably connected to the left side member and the right side member so that the intermediate members may traverse the the interior of the base between the front end member and the rear end member;
   (c) each intermediate member having a plurality of vertical, telescopically adjustable, engine support column members slideably mounted on the intermediate member;
   (d) each column member further having a plurality of pin means for maintaining the vertical height of the telescoping body;
   (e) means mounted on the base for supporting a test panel; and
   (f) a test panel mounted on the test panel supporting means, said test panel including means for monitoring an engine
   said means for monitoring includes means for starting and stopping the engine,
   a plurality of rear post members are mounted on the rear end member; and said
   test panel support means comprises an upright member mounted on each rear end post member and a cross-bar joining the upright members.

2. The portable engine test stand of claim 1, wherein each column member has bracket means for supporting an engine.

3. The portable engine test stand of claim 1, wherein the test panel support means further comprises brace means for supporting each upright member.

4. The portable engine test stand of claim 1, wherein each intermediate member includes a collar member at each end thereof that is slideably mounted on a side member.

5. The portable engine test stand of claim 1, wherein each column member has a column member collar at its mounting end that is slideably mounted on the intermediate member.

6. The portable engine test stand of claim 5, wherein each column member further comprises:
   a vertical, inner support member attached to the column member collar; and
   a sleeve member telescopically encompassing the inner support member, and having a plurality of apertures longitudinally distributed to receive a pin means.

7. The portable engine test stand of claim 6, wherein each pin means has a length longer than the outer diameter of the sleeve member that the pin means inserted through the apertures of the sleeve member maintains the vertical height of the column member.

8. The portable engine test stand of claim 1, further comprising a stabilizing member in the interior of the base rigidly connecting the rearward portions of the left side member and the right side member.

9. The portable engine test stand of claim 1, further comprising:
   means for maintaining a running engine.

10. The portable engine test stand of claim 9, wherein the test panel support means further comprises means for holding a gas tank.

11. The portable engine test stand of claim 10, wherein the means for maintaining a running engine comprises a gas tank held by the gas tank holding means.

12. The portable engine test stand of claim 1, further comprising:
   a plurality of wheels supporting the base.

13. The portable engine test stand of claim 12, further comprising:
   a pair of wheels supporting the base at the rear end member.

14. The portable engine test stand of claim 13, further comprising:
   a pair of wheels supporting the base at the front end member.

15. The portable engine test stand of claim 14, wherein the wheels supporting the base at the rear end member are swivelable.

16. The portable engine test stand of claim 15, wherein the wheels supporting the base at the front end member are fixed.

17. The portable engine test stand of claim 1, wherein the number of column members mounted on each intermediate member is two.

18. The portable engine test stand of claim 1, wherein the number of the intermediate members is two.

* * * * *